Sept. 9, 1969      CHU QUON CHIN      3,466,531

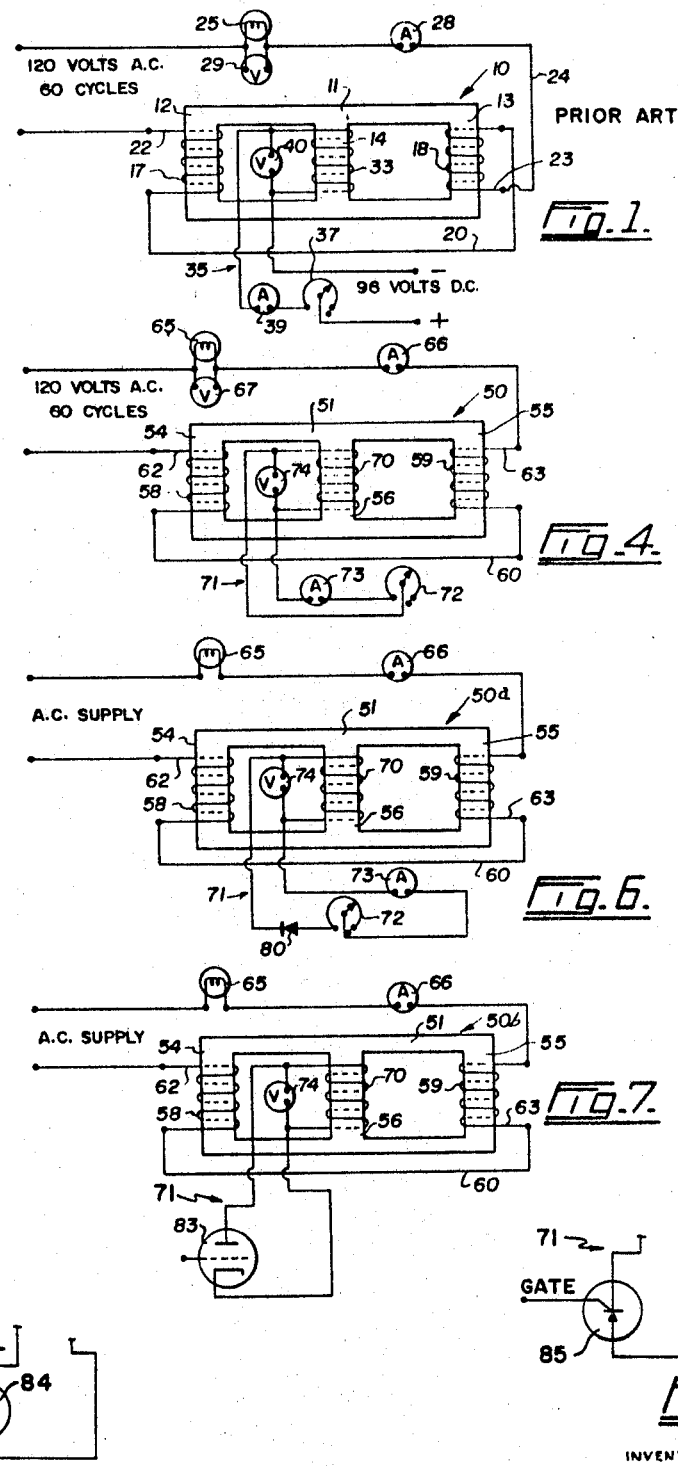

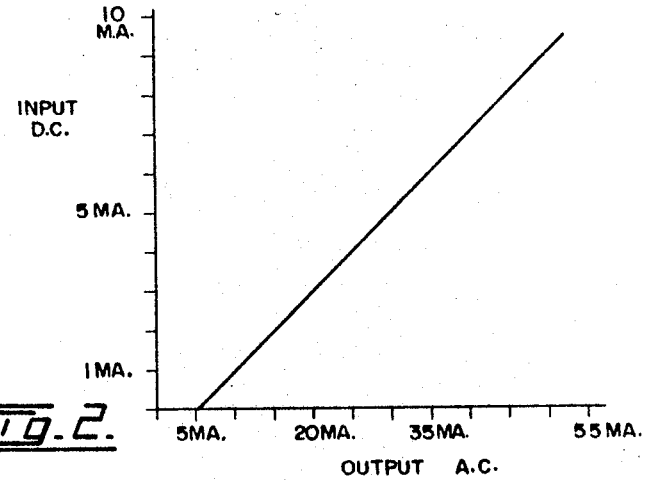
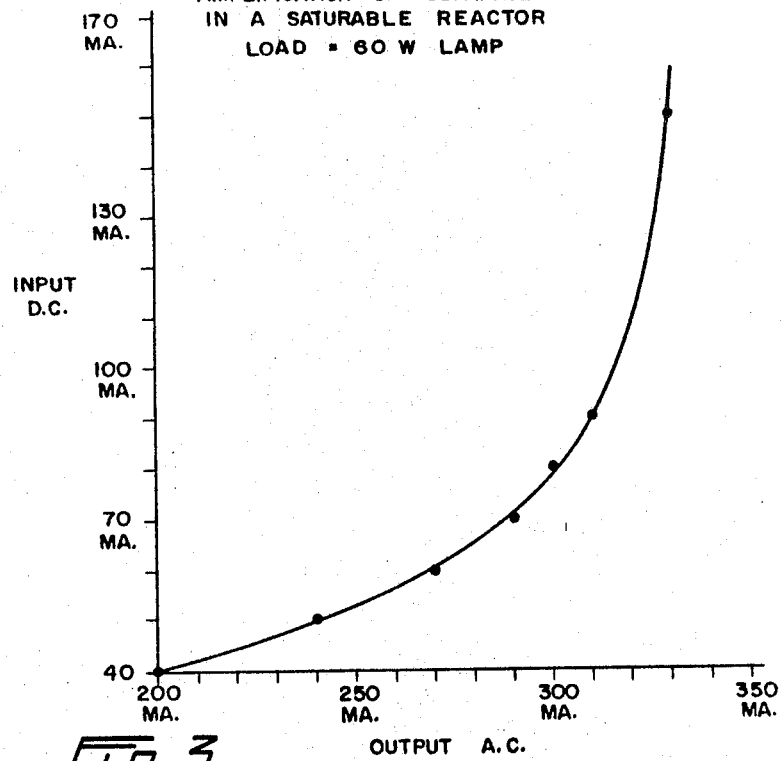

MAGNETIC VOLTAGE CONTROL APPARATUS

Filed May 27, 1968      3 Sheets-Sheet 3

INVENTOR
CHU QUON CHIN
BY
ATTORNEYS

United States Patent Office 3,466,531
Patented Sept. 9, 1969

3,466,531
MAGNETIC VOLTAGE CONTROL APPARATUS
Chu Quon Chin, P.O. Box 226, Gold River,
British Columbia, Canada
Continuation-in-part of application Ser. No. 487,195,
Sept. 14, 1965. This application May 27, 1968, Ser.
No. 732,163
Int. Cl. H02p 13/06; H02n 5/22, 5/20
U.S. Cl. 323—86
8 Claims

ABSTRACT OF THE DISCLOSURE

A magnetic voltage controller having series connected load windings wound about the two outer legs of a three legged transformer in such a manner that the voltages induced in a control winding wound on the third leg of the transformer are added to each other. The current flow through the load windings is controlled by controlling the flow of induced current through the control winding.

Cross-references to related applications

Figure 5:
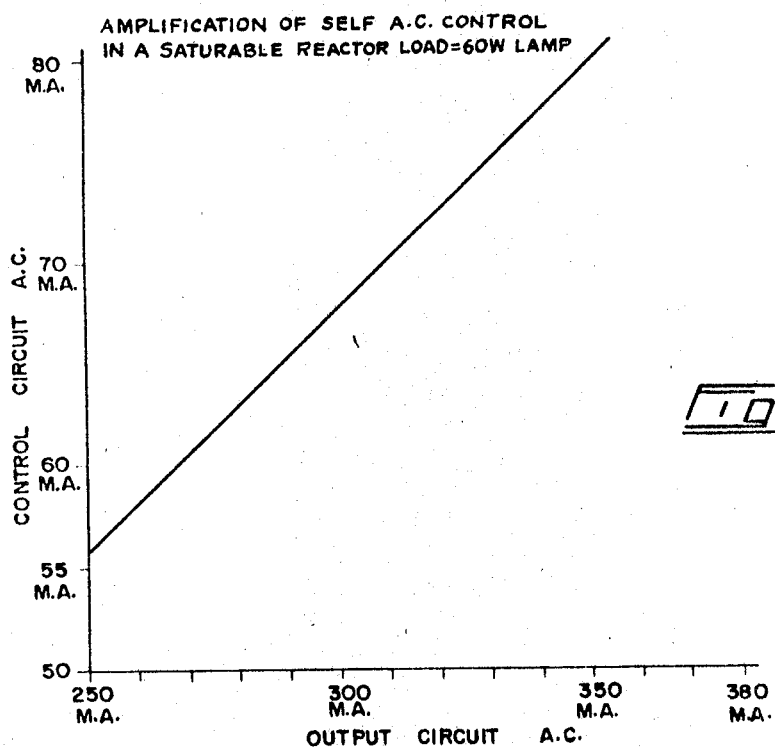

This is a continuation-in-part of application S.N. 487,-195, filed September 14, 1965, now abandoned.

This invention relates to magnetic devices for controlling the flow of electrical current without the use of power-consuming resistances in the electrical circuit.

The voltage controller according to this invention is an improvement over the standard separate DC control saturable reactor. This standard saturable reactor includes a transformer core having two outer legs and a centre leg. Output or load windings are wound on the outer legs and are connected in series. These output windings are also respectively connected to an AC power supply and a load. The device includes a control winding on the centre leg which is connected to a DC power supply and control. The output and control windings are wound in such a way that there is no voltage induced in the control winding. When there is no current flow in the control winding, the current flowing through the output windings is at a minimum. As the current flow through the control winding is increased, the current flow through the output windings increases. This reactor impedance consumes only a small fraction of the power which would be consumed by a rheostat used to reduce the current flow in the load line. However, an extra DC power supply is required for this purpose.

A variable reluctance electrical current controller according to this invention eliminates the necessity of a power source in the circuit of the control winding, and it controls the flow of current through a load line in a more efficient manner than the standard separate DC control saturable reactor.

The present electrical voltage and current controller includes a transformer core having a centre leg and two outer legs defining two flux loop paths with a centre leg common to both paths. Output or load windings on the two outer legs are connected in series and are adapted respectively to be connected to an AC power source and a load. A control winding on the centre leg is in a self-contained circuit, and this circuit includes control means adapted to regulate the flow of induced current through said circuit from free flow down to no flow. The output windings and the control winding are wound so that voltages induced in the control winding are added. The control winding is such that sufficient induced current can flow therethrough to create a magnetic flux in the centre leg and substantially saturate said centre leg, thereby blocking the passage of the magnetic flux caused by the flow of current through the two output windings. At this time, the current flow through the output windings is at a maximum. The control means in the closed circuit can be operated to reduce the flow of current through the control winding and thereby reduce current flow through the output windings. The controller of the present invention differentiates from the standard saturable reactor in that no electrical energy from an external power source is introduced into the control winding for the purpose of controlling the current flow through the load or output windings.

The current in the control winding creates its own magnetic flux. If the centre leg is completely saturated by the flux created by the current in the control winding, there is high reluctance to the flux from the two output windings. At this time, the two output windings become almost non-inductive, and the output is at a maximum. The output is controlled by the amount of saturation of the centre leg which, in turn, is controlled by the amount of current flowing in the control winding. The amount of current in the control winding is regulated by the control means in the closed circuit of said winding.

Figure 10:
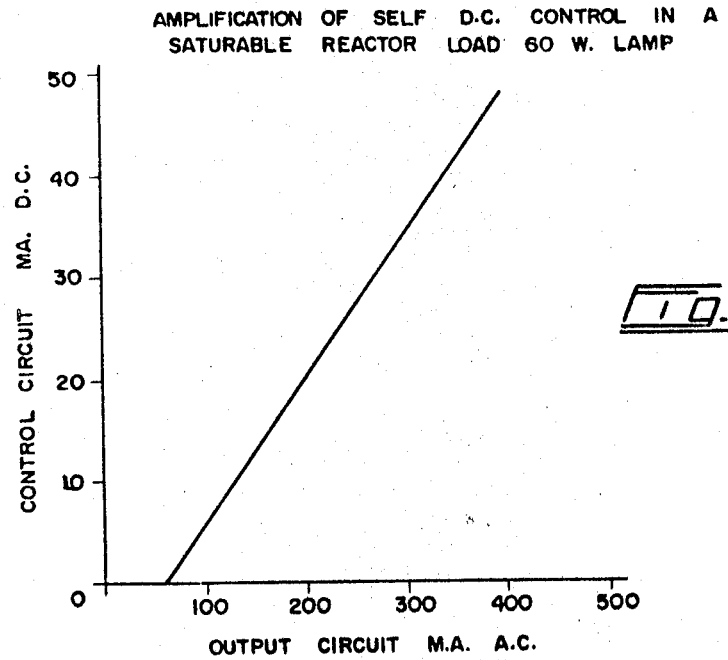

The following drawings illustrate a standard separate DC control saturable reactor and several illustrative forms of the present invention, FIGURE 1 is a simplified circuit diagram of a standard separate DC control saturable reactor of the prior art, FIGURES 2 and 3 are graphs illustrating the results attained by the standard reactor, FIGURE 4 is a simplified circuit diagram of a self AC controller according to the present invention, FIGURE 5 is a graph diagrammatically illustrating results attained from the self AC controller, FIGURE 6 is a simplified circuit diagram of an alternative self DC controller according to the present invention, FIGURE 7 is a circuit diagram of another alternative form of self DC controller, FIGURE 8 is a transistor that may be used in the control of the controller of FIGURE 7, FIGURE 9 is a silicon controlled rectifier that may be used in the control of the controller of FIGURE 7, and FIGURE 10 is a graph diagrammatically illustrating results attained from the self DC controllers.

Referring to the drawings, FIGURE 1 illustrates a standard separate DC control saturable reactor 10 of the prior art including a transformer core 11 having outer legs 12 and 13 and a centre leg 14. The outer legs 12 and 13 define a flux loop path for the output windings. Load or output windings 17 and 18 are wound on outer legs 12 and 13 and are connected in series by wire 20. The end 22 of winding 17 is adapted to be connected to an AC power source, and the end 23 of winding 18 is adapted to be connected by a wire 24 to a load, such as an electric lamp 25. For experimental purposes, an ammeter 28 is connected in series with winding 18 and lamp 25, and a volt meter 29 is connected across the load or lamp 25.

A control winding 33 is wound on centre leg 14 and forms part of a circuit 35 which is adapted to be connected to a DC power source. A rheostat 37 is provided in circuit 35 for control purposes. For experimentation, an ammeter 39 is connected in series with control winding 33 and rheostat 37, and a volt meter 40 is connected across coil 33.

Windings 17, 18 and 33 are wound in such a way that there is no voltage induced in control winding 33. The voltage in circuit 35 is supplied by the outside DC power source to which said circuit is connected. If current flows through control winding 33, it creates its own magnetic flux. If rheostat 37 is set so that there is a maximum current flow through the control winding, the iron core is substantially saturated. The saturated iron core offers a low reluctance to the flux produced by the flow of current through output or load windings 17 and 18, thus greatly reducing the inductive reactance of the output windings. As a result of this, there will be a maximum flow of current through the output windings. The output of windings 17 and 18 is controlled by the degree of saturation of the iron core, and this in turn, is controlled by regulating the flow of current from the DC source through circuit 35 by means of rheostat 37. When the rheostat creates a maximum resistance in circuit 35, a minimum of current will flow to the load 25.

The standard saturable reactor 10 was used in association with a load consisting of a 60-watt light bulb and the following measurements were made by means of ammeters 28 and 39, and volt meters 29 and 40.

Saturable reactor measurement in output and input separate DC control; load, 60 watt light bulb Input

| DC current, ma. | DC voltage |
| --- | --- |
| 0 | 0 |
| 1 | .45 |
| 2 | .9 |
| 3 | 1.4 |
| 5 | 2.3 |
| 7 | 3.2 |
| 9 | 4.6 |
| 40 | 19 |
| 50 | 23.5 |
| 60 | 27.5 |
| 70 | 33 |
| 80 | 37.5 |
| 90 | 47 |
| 150 | 72 |
| 180 | 96 |

Output

| AC current, ma. | AC voltage (across the load) |
| --- | --- |
| 6.5 | .1 |
| 9.5 | .13 |
| 14 | .2 |
| 18 | .25 |
| 28 | .4 |
| 38 | .55 |
| 51 | .75 |
| 200 | 22 |
| 240 | 35 |
| 270 | 46 |
| 290 | 51 |
| 300 | 56 |
| 310 | 59 |
| 330 | 69 |
| 340 | 72 |

DC Power Input=.08×37.5=3 watts.
AC Power Output=.3×56=16.8 watts.

The graphs of FIGURES 2 and 3 illustrate different numbers of milliamperes used in the input DC to control different milliamperes in the output AC in the reactor 10.

FIGURES 1 to 3 and the description associated with them have been inserted to provide a comparison between the standard separate DC control saturable reactor of the prior art and the current controllers of the present invention hereinafter described.

FIGURE 4 illustrates a self AC electrical current controller 50 in accordance with the present invention and having an iron, preferably a laminated, transformer core 51 having outer legs 54 and 55 and a centre leg 56 defining two flux loop paths with the centre leg common to both paths. Output or load windings 58 and 59 are wound on outer legs 54 and 55, and are connected in series by wire 60. The end 62 of output or load coil 58 is adapted to be connected to an AC supply source, and the end 63 of output or load coil 59 is connected to a load, such as a light bulb 65. For experimental purposes, ammeter 66 is connected in series with coil 59 and load 65, and a volt meter 67 may be connected across the load 65.

A control coil or winding 70 is wound on centre leg 56 and forms part of a self-contained circuit 71 which also includes a rheostat 72 and an ammeter 73 in series with the control coil. A volt meter 74 may be connected across control winding 70.

Output windings 58 and 59 and control winding 70 are wound in such a way that the voltages induced in the control winding are added to each other. It will be noted that winding 59 is connected in the load circuit of this controller opposite to the connection of winding 18 in the load circuit of the standard reactor 10. The power output of controller 50 is controlled by the induced current in the control winding from the output or load windings. The induced voltage produces current to control the output of this controller. When current flows through output coils 58 and 59, opposite magentic polarities are produced at the ends of the outer legs 54 and 55. The magnetic flux in these legs flows through the centre leg in order to complete the magnetic circuit. If some current flows through control coil 70, it creates a magnetic flux in centre leg 56. If the centre leg is saturated by the flux, the leg offers a high reluctance to the flux of the output coils. When the centre leg is saturated, the magnetic flux produced in leg 54 by the current in winding 58 is opposed or cancelled by that produced in leg 55 by the current in winding 59. This greatly reduces the inductive reactance of the output coils and, therefore, more current will flow through said output coils. The amount of output is controlled by the degree of saturation of centre leg 56, and this is regulated by means of rheostat 72. The centre leg acts as a gate for the magnetic flux produced by the output current, and the current flowing in the control coil is used to completely open, partly open or close this gate. The current required to block the magnetic flux to the output is self-regulated, that is, as more current flows through the output windings, more current is induced in the control coil. The increase in the induced current creates more flux in the centre leg in order to block the flux of the output current.

The current controller 50 was connected to a 120-volt, 60-cycle AC power source and to a load consisting of a 60-watt light bulb, and using a 5000-ohm, 50-watt rheostat, the following measurements were made.

Saturable reactor measurement in input and output self AC control; load, 60-watt light bulb Control circuit

| Voltage AC (across the control coil) | Current AC, ma. |
| --- | --- |
| 580 | 10 |
| 275 | 56 |
| 240 | 60 |
| 140 | 70 |
| 23 | 80 |
| .1 | 82 |

Output circuit

| Voltage AC (across the load) | Current AC |
| --- | --- |
| .1 | 7 |
| 37 | 250 |
| 41 | 270 |
| 58 | 310 |
| 75 | 350 |
| 79 | 360 |

[1] Not complete circuit.

AC Power Input=23×.08=1.84 watts.
AC Power Output=75×.350=26.25 watts.

The graph of FIGURE 5 illustrates measurements in milliamperes of the control circuit AC and the output circuit AC.

During operation of controller 50, as the resistance of rheostat 72 decreased, more current flowed through control winding 70, and much more current flowed through the output windings 58 and 59 to load 65. The maximum output of the device took place when control circuit 71 was shorted at the rheostat. According to the above chart, 1.84 watts controls 26.25 watts output, 80 ma. controls 350 ma. output. On the other hand, with standard saturable reactor 10, 3 watts controls 16.8 watts output, and 80 ma. controls 300 ma. output.

FIGURE 6 illustrates a self DC electric current controller 50a which is quite similar to the above-described controller 50. The only difference is that control circuit 71 includes a rectifier 80 so the DC flows through control winding 70.

FIGURE 7 illustrates another self DC electric current controller 50b which is slightly different from controller 50a. The only difference is that in control circuit 71, rheostat 72 and rectifier 80 have been replaced by an electronic tube 83, such as a triode, so that the grid of the tube is used for controlling purposes. This tube may be replaced with a transistor 84 (see FIGURE 8) the base of which is used for controlling purposes or by a silicon controlled rectifier 85 (see FIGURE 9) the gate of which is used for the same purpose. The use of the tube 83, transistor 84 or silicon controlled rectifier 85 may result in the introduction of a signal current into the control windings. This extra current, however, would be in minimal proportions relative to the induced current and would have little or no controlling effect on the output current. As controller 50b operates in the same manner as controller 50a, the only difference being in the control means of the control circuit, the operation of controller 50a only will now be described.

Controller 50a was connected to a 120-volt, 60-cycle power source and to a 60-watt light bulb. The following measurements were made with the different DC flowing in control circuit 71 and control coil 70:

Saturable reactor measurement in input and output self DC control; load, 60-watt light bulb Control circuit

| Voltage AC (across the control coil) | Current DC, ma. |
|---|---|
| 460 | 15 |
| 420 | 20 |
| 400 | 22 |
| 380 | 24 |
| 360 | 26 |
| 340 | 28 |
| 320 | 30 |
| 290 | 32 |
| 270 | 34 |
| 250 | 36 |
| 230 | 38 |
| 210 | 40 |
| 190 | 42 |
| 160 | 44 |

Output circuit

| Voltage AC (across the load) | Current AC, ma. |
|---|---|
| 13.7 | 160 |
| 25 | 200 |
| 31 | 220 |
| 36 | 240 |
| 40 | 260 |
| 46 | 270 |
| 50 | 280 |
| 55 | 290 |
| 61 | 310 |
| 65 | 320 |
| 69.5 | 330 |
| 74 | 340 |
| 78 | 355 |
| 82.5 | 370 |

The graph of FIGURE 10 illustrates the measurements in ma. of the DC in the control circuit, and the measurements in ma. of the AC in the output circuit. This shows that in a self DC current controller, 40 ma. controls 340 ma. output. On the other hand, in the standard separate DC control saturable reactor, 40 ma. controls 200 ma. output.

What I claim as my invention is:

1. A magnetic voltage controller, comprising a transformer core having a centre leg and first and second outer legs defining two flux loop paths with the centre leg common to both paths, a first output winding on the first outer leg and a second output winding on the second outer leg connected in series, the first and second output windings being disposed respectively for connection to an AC power source and a load, a control winding on the centre leg in a control circuit, said control circuit being such that substantially only induced current flows therein, and control means in said control circuit adapted to regulate the flow of induced current through said control circuit from free flow down to no flow, said first and second output windings and said control winding being so wound that voltages induced in the control winding are added, said control winding being such that sufficient induced current can flow therethrough to create a magnetic flux in the centre leg and substantially saturate said centre leg thereby blocking the passage of the magnetic flux caused by the flow of current through the first and second output windings, at which time the current flow through said output windings is at a maximum, and as said control means is operated to reduce the flow of induced current through the control winding, the current flow through the output windings is reduced.

2. A current controller as claimed in claim 1 including a rectifier in the control circuit so that DC flows through the control winding.

3. A current controller as claimed in claim 1 in which the control means comprises an electronic tube having a grid operable for controlling purposes.

4. A current controller as claimed in claim 1 in which the control means comprises a transistor, the base of which is used for controlling purposes.

5. A current controller as claimed in claim 1 in which the control means comprises a silicon controlled rectifier, the gate of which is used for controlling purposes.

6. A current controller as claimed in claim 1 in which the control means comprises a rheostate in the control circuit.

7. A current controller as claimed in claim 1 in which the transformer core is made of laminated iron.

8. A current controller as claimed in claim 7 in which the control means comprises a rheostat in the control circuit.

References Cited

UNITED STATES PATENTS

| 2,126,790 | 8/1938 | Logan | 323—88 X |
| 2,686,290 | 8/1954 | Macklem | 323—86 X |
| 2,817,057 | 12/1957 | Hollman | 323—87 X |

FOREIGN PATENTS 1,057,651   5/1959   Germany.

LEE T. HIX, Primary Examiner

G. GOLDBERG, Assistant Examiner

U.S. Cl. X.R.

323—89